Figure 1:
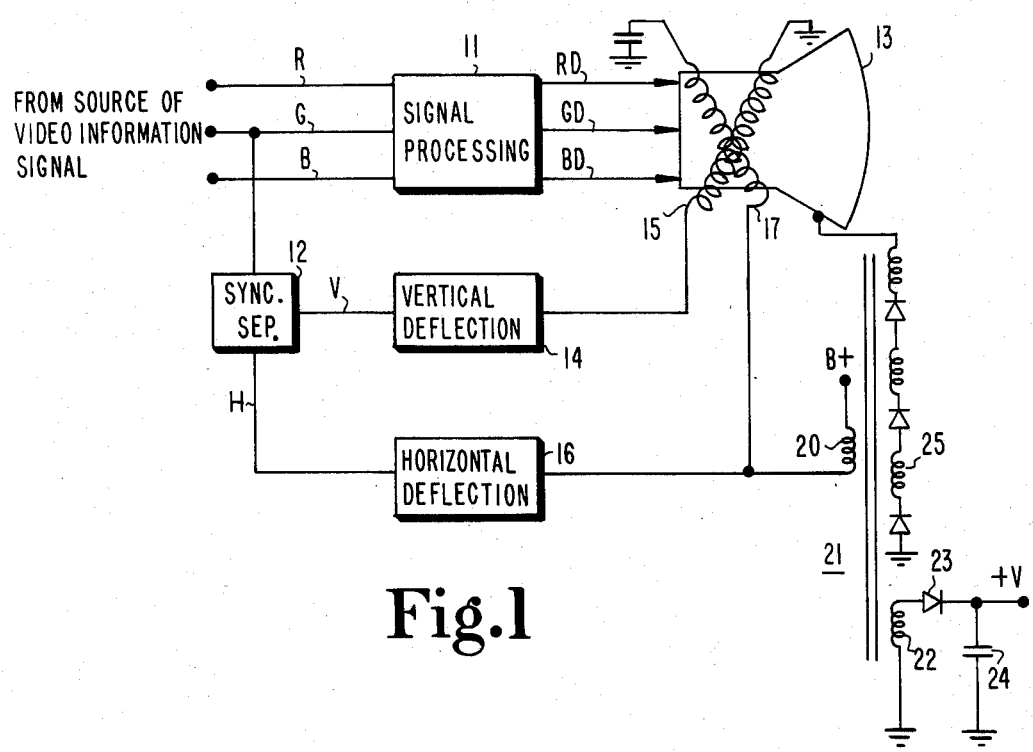

United States Patent [19]

Barnes

[11] Patent Number: 4,612,574

[45] Date of Patent: Sep. 16, 1986

[54] OSCILLATOR-FREQUENCY CONTROL INTERFACE CIRCUIT

[75] Inventor: Robert A. Barnes, Bainbridge, Pa.

[73] Assignee: RCA Corporation, Princeton, N.J.

[21] Appl. No.: 542,311

[22] Filed: Oct. 14, 1983

[51] Int. Cl.$^4$ .............................................. H04N 5/04
[52] U.S. Cl. .................................. 358/158; 358/159;
358/195.1; 331/20
[58] Field of Search ..................... 358/158, 159, 195.1,
358/153; 331/20

[56] References Cited

U.S. PATENT DOCUMENTS

| 3,241,084 | 3/1966 | Klingberg | 331/111 |
|---|---|---|---|
| 3,319,179 | 5/1967 | Hepner | 331/8 |
| 3,873,766 | 3/1975 | Maeda | 331/20 |
| 3,937,876 | 2/1976 | Amsen et al. | 358/158 |
| 4,047,223 | 9/1977 | Hofmann | 358/158 |
| 4,155,049 | 5/1979 | Kitazawa et al. | 331/20 |
| 4,228,463 | 10/1980 | Steckler et al. | 358/158 |
| 4,266,245 | 5/1981 | Balaban et al. | 358/158 |
| 4,327,376 | 4/1982 | Balaban et al. | 358/159 |

FOREIGN PATENT DOCUMENTS 2083721 8/1981 United Kingdom .

OTHER PUBLICATIONS

Application Note for CA 1391E, RCA Linear Integrated Circuits Data Book, pp. 775–779.

Primary Examiner—James J. Groody
Assistant Examiner—Michael D. Parker
Attorney, Agent, or Firm—Paul J. Rasmussen; Joseph Laks; Scott J. Stevens

[57] ABSTRACT

A video display apparatus having automatic frequency control circuitry for adjusting the frequency of a horizontal oscillator to provide oscillator synchronization with incoming horizontal synchronizing pulses incorporates an interface circuit for controlling the horizontal oscillator frequency response to frequency control output voltage. The interface circuit incorporates a two-transistor switch which provides a current path for charging the horizontal oscillator timing capacitor during a portion of the horizontal interval and a current path for bypassing the horizontal oscillator timing capacitor during another portion of the horizontal interval. The amplitude of the frequency control output voltage will determine the relative length of time that each of the transistors is conducting in order to provide a net increase or decrease rate in the charging of the oscillator capacitor, which in turn adjusts the oscillator operating frequency.

8 Claims, 3 Drawing Figures

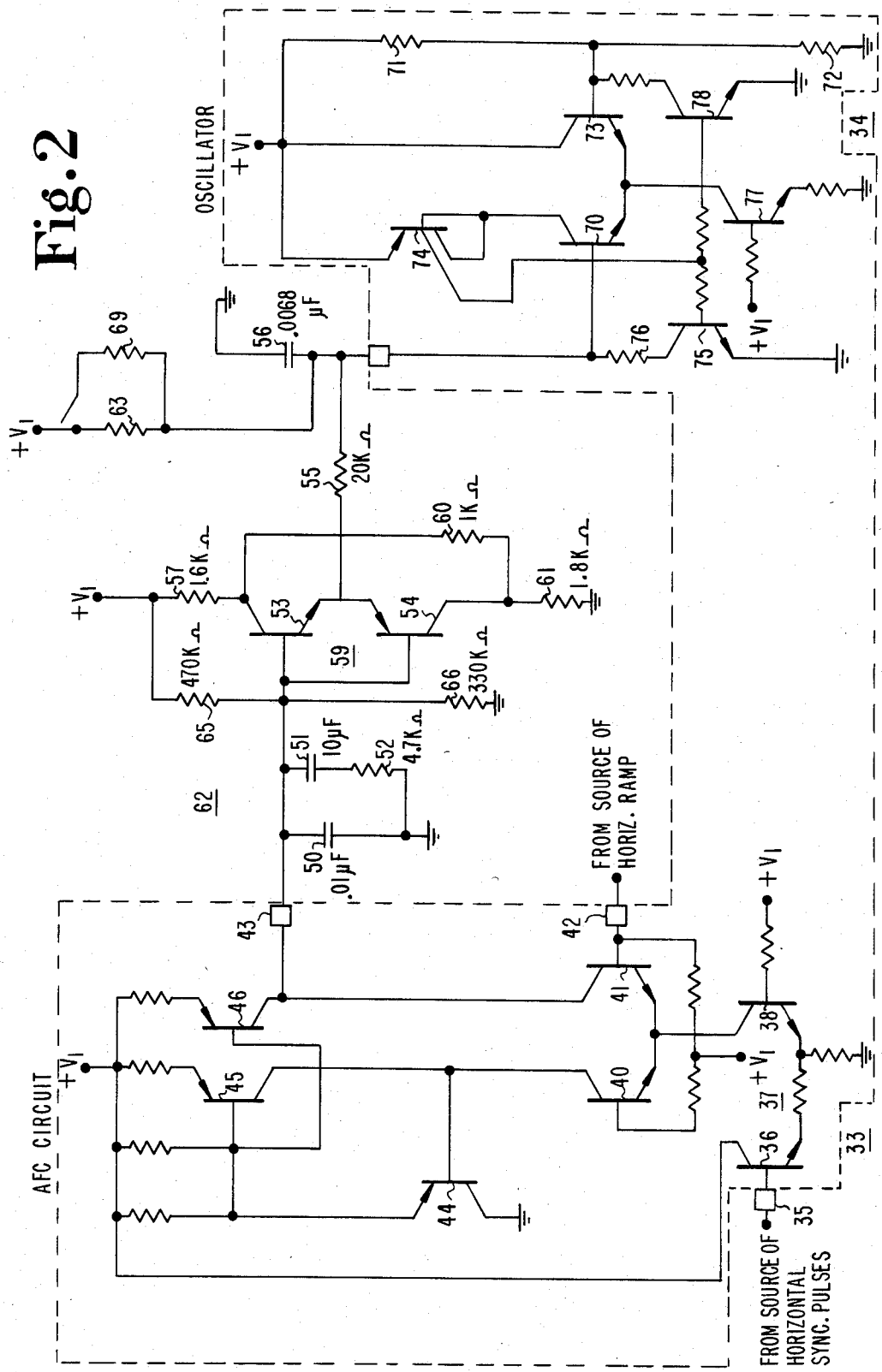

OSCILLATOR-FREQUENCY CONTROL INTERFACE CIRCUIT

This invention relates to frequency control circuits for video display apparatus and in particular to frequency control circuits having large pull-in ranges.

In order to display video information on the face of a cathode ray tube, a video display apparatus causes an electron beam or beams to be rapidly scanned across a phosphor display screen on the face of the cathode ray tube. The incoming video signal comprising the video information is processed to form a signal or signals which control the intensity of the electron beam as it is scanned across the cathode ray tube display screen. The level of electron beam intensity or beam current determines the amount of light output from the phosphor display screen which forms the visible image of the incoming video signal.

The incoming video signal may also comprise synchronizing pulses which are used to control the rate at which the electron beam is scanned across the face of the cathode ray tube so that the scanning rate or frequency coincides with the rate at which the video signal information is provided. In particular, it is important that the video information be synchronized with the horizontal scanning or deflection rate of the electron beam or beams. This is often accomplished by the use of automatic frequency control circuits which adjust the deflection rate to coincide with the rate of the incoming video information.

A conventional automatic frequency control circuit operates by forming a sawtooth or ramp signal from the horizontal retrace pulses. This horizontal rate ramp signal is then compared in time to the incoming horizontal synchronizing pulses. The amplitude or voltage level of the retrace generated ramp signal at the time of occurrence of the horizontal synchronizing pulses is used to generate a signal which controls the rate at which an oscillator timing capacitor is charged or discharged. The charge and discharge rate of the timing capacitor determines the horizontal deflection oscillator operating frequency which in turn determines the scanning or deflection rate of the electron beam.

The pull-in range of the automatic frequency control circuit, that is, the amount of frequency adjustment of the horizontal deflection oscillator that is possible in order to synchronize the oscillator frequency with the incoming video signal rate, is in part determined by the automatic frequency control output error voltage which is essentially the difference between the sampled horizontal rate ramp voltage and its nominal voltage at the oscillator free running frequency. The high impedance load ordinarily provided between the automatic frequency control circuit and the oscillator timing circuit requires a fairly large frequency control error voltage to cause a significant deviation in the oscillator operating frequency. Since the error voltage is generated by the phase relationship between the horizontal synchronizing pulses and the horizontal retrace pulse generated ramp voltage, a large error voltage and, hence, a large frequency pull-in range, requires a large phase difference between the synchronizing pulse and horizontal retrace pulse. Changes in component values due to changes in operating temperature, for example, as a result of the phase difference between the horizontal synchronizing pulses and horizontal retrace pulses may cause a shift of video information within the scanned raster on the cathode ray tube display screen. This may result in an apparent change in centering of the video information.

In conventional television receivers in which broadcast information is being received, the incoming video signal rate is ordinarily very close to the free running frequency of the horizontal deflection oscillator. Large automatic frequency control error voltages do not result and the previously described picture information shift does not occur to a great extent. Any video information shift that does occur is not particularly noticeable because of the rapidly changing video information that occurs in a normal television broadcast program.

The previously described characteristics which occur with broadcast video signals used by conventional television receivers are not present when, for example, the video display apparatus is utilized as a computer monitor or other form of video information terminal. The pull-in range requirement of the automatic frequency control circuit is increased because different computers provide video information at a rate which may be significantly different than the free running horizontal deflection rate of the horizontal oscillator. It is desirable to provide adaptability to different computer systems without requiring internal adjustment of the horizontal oscillator. The large frequency control error voltages which would be expected to be generated by this increased frequency pull-in range requirement are not acceptable when the video display apparatus is used as a computer monitor or video information terminal. The resulting video information shift may cause some video information to occur during the horizontal blanking interval which, when text were displayed, for example, would result in some information not being displayed properly.

It is important that a video display apparatus that is used as a computer monitor or video information terminal be capable of synchronizing its horizontal deflection oscillator over a wide range of frequencies without introducing an appreciable amount of video information phase shift within the scanned raster.

In accordance with an aspect of the present invention, a video display apparatus comprises a horizontal deflection circuit which provides horizontal retrace pulses. The horizontal deflection circuit incorporates a horizontal rate oscillator having a capacitor. The operating frequency of the oscillator is determined by the charge and discharge rate of the capacitor. A frequency control circuit is responsive to the horizontal retrace pulses and responsive to horizontal synchronizing pulses for providing an output signal which has an amplitude that is determined by the phase relationship between the horizontal retrace pulses and the horizontal synchronizing pulses. An interface circuit comprises a switch which has a first terminal coupled to the frequency control circuit and a second terminal connected to the capacitor of the horizontal rate oscillator. A third terminal of the switch is connected to a source of voltage and a fourth switch terminal is connected to a source of reference potential. The switch provides a current path from the source of voltage to the capacitor for increasing the charging rate of the capacitor when the amplitude of the frequency control circuit output signal exceeds a first predetermined level. The switch provides a current path that bypasses the capacitor for decreasing the charging rate of the capacitor when the amplitude of the frequency control circuit output signal is below a second predetermined level.

Figure 1A:
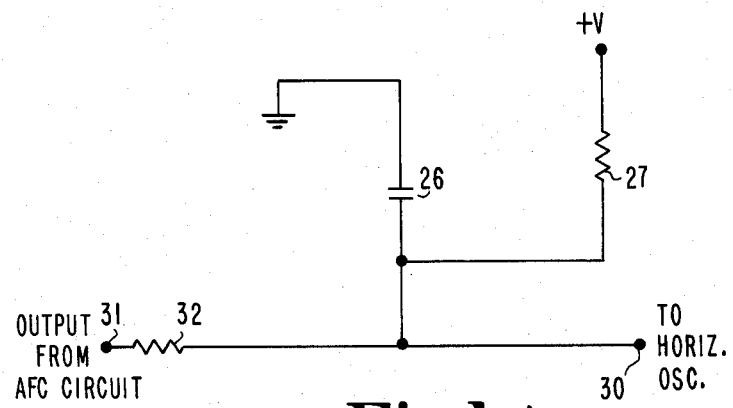

In the accompanying drawing,

FIG. 1 is a block and schematic diagram of a portion of a video display apparatus;

FIG. 1A is a schematic diagram of a portion of a horizontal oscillator timing circuit which is controlled by the output from an automatic frequency control circuit; and FIG. 2 is schematic diagram of a portion of a horizontal deflection circuit in accordance with an aspect of the present invention, illustrating an interface circuit for controlling the frequency of the horizontal oscillator in response to a frequency control output signal.

Referring to FIG. 1, there is a shown a schematic and block diagram of a portion of a video display apparatus which receives a video information signal from, for example, a computer. This video information signal may be of the form of a composite video signal incorporating chrominance and luminance information along with horizontal and vertical synchronizing information and a color oscillator burst signal. The video information signal may be provided as either a modulated or as a base band video signal. The video information signal may also be of the form of separate red, blue and green color signals (RGB signals) with the synchronizing signals incorporated in one of the color signals or as a separate input. The form of the video information signal will, of course, depend on the design of the video information signal source. For illustrative purposes, the circuit of FIG. 1 is shown in a form which would be responsive to separate RGB signals having demodulated, or base band, video information.

The video information signal is provided as RGB signals from a source of video information to signal processing circuits 11. The green video signal is also applied to a synchronizing separator circuit 12. The signal processing circuits provide red, green and blue drive signals (RD, GD, BD) to the electron gun assembly, not shown, of a cathode ray tube 13.

The synchronizing separator circuit 12 provides vertical synchronizing pulses on a conductor V to a vertical or field rate deflection circuit 14 which illustratively provides a vertical deflection current in a vertical deflection winding 15 disposed on the kinescope 13. Synchronizing separator circuit 12 also provides horizontal or line rate synchronizing pulses on a conductor H which, illustratively, are applied to a horizontal deflection circuit 16 which generates horizontal deflection current in a deflection winding 17, also disposed on cathode ray tube 13.

The horizontal deflection circuit 16 also generates horizontal retrace pulses which are applied to winding 20 of a power supply transformer 21. Power supply transformer 21 is shown as illustratively comprising a secondary winding 22 which, via rectifying diode 23 and a filter capacitor 24, provides a source of voltage +V which may be used to power other receiver circuits. Power transformer 21 also comprises high voltage winding 25 which generates a high voltage or ultor potential which is applied to the anode terminal of cathode ray tube 13.

Horizontal deflection circuit 16 may incorporate an automatic frequency control (AFC) circuit which adjusts the rate of the horizontal deflection oscillator within the horizontal deflection circuit 16 to correspond to the frequency to the incoming horizontal synchronizing pulses on conductor H derived from the video information signal. A typical AFC circuit operates by forming a horizontal rate ramp or sawtooth signal which is derived from the horizontal retrace pulses. The measured amplitude of the retrace pulse derived horizontal rate ramp signal at the time of the occurrence of a horizonal synchronizing pulse provides a voltage which is used to change the rate at which a horizontal oscillator timing capacitor is charged or discharged. Since the capacitor charges or discharges to preset levels, the rate at which it charges or discharges will determine the frequency of operation of the horizontal oscillator. For example, increasing the charging rate or discharging rate of the capacitor will increase the horizontal oscillator frequency, while decreasing the rate of charge or discharge of the capacitor will decrease the frequency of oscillator operation.

FIG. 1A illustrates a portion of the oscillator timing circuit comprising a timing capacitor 26. Capacitor 26 is ordinarily charged from the +V supply through resistor 27. The voltage across capacitor 26 is applied to the horizontal oscillator input designated as terminal 30. Circuitry within the horizontal oscillator (not shown) sets the levels to which the capacitor 26 will charge and discharge. The output from the AFC circuit at terminal 31 is applied via a resistor 32 to capacitor 26 to change the rate at which the capacitor 26 charges.

The AFC circuit will ordinarily provide a nominal output voltage when the horizontal oscillator is synchronized with the frequency of the incoming horizontal synchronizing pulses. When the incoming horizontal synchronizing pulses are not synchronized with the horizontal oscillator, the output voltage from the AFC circuit will vary from its nominal value, thereby affecting the charging rate of capacitor 26. For example, if the synchronizing pulse should occur at an earlier time, indicating the oscillator is operating too slowly, the output voltage from the AFC circuit will be of a greater amplitude than its nominal value and capacitor 26 will be charged at a slightly higher rate, thereby increasing the frequency of operation of the horizontal oscillator in order to bring it into synchronization with the incoming horizontal synchronizing pulses.

Resistor 32 is ordinarily of a very high impedance which limits the effect that the change in voltage from the AFC circuit will have on capacitor 26. In order to provide a large frequency pull-in range for the horizontal oscillator, the change in output voltage from the AFC circuit must be quite large, which in turn requires that the phase difference between the horizontal retrace pulse and horizontal synchronizing pulse must also be quite large. This may result in a noticeable shift of picture information within the scanned raster on the kinescope face, which is particularly annoying and may result in improperly displaced information when the kinescope or video information terminal is used to display text or graphics generated by a computer.

FIG. 2 illustrates a schematic diagram of a portion of a horizontal deflection circuit incorporating an automatic frequency control circuit and a horizontal oscillator. In accordance with an aspect of the present invention, an interface amplifier circuit is illustrated which provides adjustment of the horizontal oscillator frequency in response to an output voltage from the AFC circuit. The AFC circuit 33 and horizontal oscillator circuit 34 are illustratively shown as being incorporated as a portion of an integrated circuit. This is illustrated by the dashed line surrounding the AFC circuit 33 and horizontal oscillator 34 in FIG. 2.

AFC circuit 33 receives horizontal synchronizing pulses from a source of horizontal sync pulses at an integrated circuit interface terminal 35. The horizontal sync pulses are applied to the base of a transistor 36 which forms a part of a differential amplifier 37. The differential amplifier 37 also includes a transistor 38. The horizontal synchronizing pulses are illustratively provided as negative-going pulses. The occurrence of a horizontal sync pulse, therefore, will turn transistor 36 off, which causes transistor 38 to be turned on. Conduction of transistor 38 causes the emitters of transistors 40 and 41 to be pulled low, causing them to also be turned on.

The horizontal sawtooth or ramp signal generated from the horizontal synchronizing pulses is applied via interface terminal 42 to the base of transistor 41. The amplitude of the horizontal ramp signal appearing at the base of transistor 41 when transistor 41 is turned on determines the voltage at the collector of transistor 41 which is applied to an integrated circuit interface terminal 43 which represents the output of the AFC circuit 33. Conduction of transistor 40 causes conduction of transistor 44 which in turn causes conduction of transistors 45 and 46. Transistors 45 and 46 are turned off in the absence of horizontal synchronizing pulses, which provides a high impedance to the output terminal 43 of the AFC circuit, which effectively eliminates any variation in AFC output voltage which might undesirably occur during the absence of horizontal synchronizing pulses.

The AFC circuit output voltage at terminal 43 charges capacitor 50 and 51. Capacitor 50 establishes a DC voltage level for the voltage appearing at the output terminal 43. Capacitor 51 along with resistor 52 provide damping for capacitor 50, which reduces undesirable variations in the voltage across capacitor 50 that may occur during the vertical retrace interval. The voltage across capacitor 50 is applied to the bases of transistors 53 and 54, which comprise a current switch 59. The emitters of transistors 53 and 54 are connected together and are coupled through a resistor 55 to the horizontal oscillator timing capacitor 56. The collector of transistor 53 is coupled to a voltage supply designated $+V_1$ through a resistor 57. The collectors of transistors 53 and 54 are connected together through a resistor 60. The collector of transistor 54 is connected to ground through a resistor 61.

Charging current for capacitor 56 is illustratively shown as being provided from a voltage source $+V_1$ via a resistor 63. In a video display apparatus which provides horizontal scanning rates at more than one frequency, different charging currents for capacitor 56 may be provided which will result in different charging rates for capacitor 56, and hence different oscillator operating rates for the horizontal deflection circuit. For example, for a desired higher oscillating frequency, resistor 69 may be switched to be in parallel with resistor 63, providing a lower impedance charging path and hence a greater charging current.

The interface circuit 62 operates in the following manner. When the voltage at the base of transistor 53 (determined by the voltage across capacitor 50) increases above the voltage level at the emitter of transistor 53 (determined by the charge on capacitor 56) sufficient to forward bias transistor 53, transistor 53 begins conducting and provides a path for current to flow from the $+V_1$ supply through resistor 57, transistor 53, resistor 55 in order to charge capacitor 56. Capacitor 56 will continue to charge in this manner until transistor 53 is no longer forward biased.

As capacitor 56 continues to charge from the $+V_1$ supply through resistor 63 or through resistors 63 and 69, the voltage on the emitter of transistor 54 increases until transistor 54 becomes forward biased, at which time it begins conducting. Conduction of transistor 54 provides a current path which bypasses charging current around capacitor 56 through resistor 55, transistor 54, and resistor 61 to ground, thereby decreasing the charging rate of capacitor 56.

If the horizontal oscillator 34 is synchronized with the incoming horizontal synchronizing pulses, the increase in charging rate of capacitor 56 occurring during conduction of transistor 53 will equal the decrease in charging rate occurring during conduction of transistor 54. If the rate at which the horizontal synchronizing pulses occur is greater than the horizontal oscillator operating frequency, the voltage on capacitor 50 will increase, so that transistor 53 will conduct for a greater length of time during a given horizontal interval than will transistor 54. This causes a net increase in the rate at which capacitor 56 is charged, which in turn increases the horizontal oscillator frequency in order to bring it into synchronization with the incoming horizontal synchronizing pulses. Similarly, if the rate of the incoming horizontal synchronizing pulses is slower than the operating frequency of the horizontal oscillator, the voltage across capacitor 50 will decrease and the conduction time of transistor 54 will be greater with respect to transistor 53, so that the charging rate of capacitor 56 will decrease, thereby decreasing the operating frequency of the horizontal oscillator.

As previously described, the switch provided by transistors 53 and 54 provide a path for current of a lower impedance than that shown in the prior art. This allows small voltage changes from the AFC circuit 33 to provide relatively large changes in horizontal oscillator operating frequency, thus increasing the pull-in range or synchronizing ability of the horizontal oscillator without introducing undesirable phase shifts between the horizontal retrace pulses and horizontal synchronizing pulses. The amount of video information shift within the scanned raster on the cathode ray tube display screen is therefore greatly reduced, thereby improving the performance of the video display apparatus when used as a computer monitor or video information terminal.

The values of resistors 57, 60 and 61 limit the rate at which capacitor 56 can be charged by operation of switch 59. This will limit the frequency pull-in range of the horizontal oscillator 34 to desired predictable levels. In particular, it is possible to provide an asymmetrical frequency pull-in range that will limit the extent to which the horizontal oscillator frequency can decrease in order to provide synchronization with the horizontal synchronizing pulses. It is desirable to limit the amount that the horizontal oscillator frequency may decrease. The oscillator frequency will determine the length of time that the horizontal output transistor is conducting, which therefore determines the horizontal retrace pulse amplitude and, hence, the high voltage level. It is desirable to limit the amount to which the high voltage level may rise for both user safety and component reliability reasons. Resistors 65 and 66 provide biasing for transistors 53 and 54 in the absence of horizontal synchronizing pulses in order to establish a nominal free running frequency for horizontal oscillator 34.

Briefly, horizontal oscillator 34 operates in the following manner. When the voltage across capacitor 56 exceeds the turn-on threshold of transistor 70 determined by bias resistors 71 and 72 at the base of transistor 73, transistor 70 conducts which turns on transistor 74, thereby turning on transistors 75 and 78. Conduction of transistors 75 causes capacitor 56 to be discharged through resistor 76 and transistor 75 to ground. Conduction of transistor 78 reduces the voltage level at the base of transistor 73, thereby providing hysteresis for the charge and discharge of capacitor 56. When capacitor 56 discharges to a level such that the voltage of the base of transistor 70 falls below that of the base of transistor 73, transistor 70 turns off and capacitor 56 again begins to charge. The rate at which capacitor 56 is charged, therefore, will determine the frequency of oscillation of horizontal oscillator circuit 34. Transistor 77 provides a current source for the bases of transistors 70 and 73.

AFC circuit 33 and horizontal oscillator circuit 34, encompassed by the dashed line in FIG. 2, may illustratively comprise a portion of a TV horizontal processor integrated circuit manufactured by RCA Corporation and identified as CA 1391E. If this integrated circuit is chosen, the component values of interface circuit 62 shown in FIG. 2 provide a frequency pull-in range of −500 Hz to +2250 Hz from a free running oscillator frequency of 15,750 Hz.

What is claimed is:

1. A video display apparatus comprising:
    a line deflection circuit providing retrace pulses and incorporating a line rate oscillator having a capacitor, the operating frequency of said oscillator determined by the charge and discharge rate of said capacitor;
    a source of line rate synchronizing pulses;
    frequency control means responsive to said retrace pulses and to said line rate synchronizing pulses for providing an output signal having an amplitude determined by the phase relationship between said retrace pulses and said line rate synchronizing pulses;
    interface means comprising switch means having a first terminal coupled to said frequency control means output signal and a second terminal coupled to said capacitor of said line rate oscillator, said switch means also having a third terminal coupled to a source of voltage and a fourth terminal coupled to a source of reference potential, said switch means providing a first current path from said source of voltage potential to said capacitor for increasing the charging rate of said capacitor when the amplitude of said frequency control means output signal exceeds a first predetermined level, said switch means providing a second current path from said source of voltage potential to said source of reference potential for decreasing the charging rate of said capacitor when the amplitude of said frequency control means output signal is below a second predetermined level.

2. The arrangement defined in claim 1, wherein said interface means further comprises an impedance coupled between said switch means third terminal and said source of voltage potential for limiting the amount of charging rate increase of said capacitor.

3. The arrangement defined in claim 1, wherein said interface means further comprises an impedance coupled between said switch means fourth terminal and said source of reference potential for limiting the amount of charge rate decrease of said capacitor.

4. The arrangement defined in claim 1, wherein said interface means further comprises an impedance coupled between said source of voltage potential and said switch means first terminal, and an impedance coupled between said switch means first terminal and said source of reference potential for providing operation of said switch means in the absence of said synchronizing pulses.

5. The arrangement defined in claim 1, wherein said switch means comprises first and second transistors.

6. The arrangement defined in claim 1, wherein said second current path bypasses said capacitor.

7. A video display apparatus comprising:
    a line deflection circuit providing retrace pulses and incorporating a line rate oscillator having a capacitor, the operating frequency of said oscillator determined by the charge and discharge rate of said capacitor;
    a source of line rate synchronizing pulses;
    frequency control means responsive to said retrace pulses and to said line rate synchronizing pulses for providing an output signal having an amplitude determined by the phase relationship between said retrace pulses and said line rate synchronizing pulses;
    interface means comprising a switch means having an input coupled to said frequency control means output signal and an output coupled to said capacitor, said switch means responsive to said frequency control means output signal for providing a current path from a source of voltage potential to said capacitor for charging said capacitor, said switch means responsive to said frequency control means output signal for providing a current path from said source of voltage potential to a source of reference potential for bypassing said capacitor.

8. In a video display apparatus incorporating automatic frequency control circuitry and a line rate oscillator, an interface circuit comprising:
    means responsive to an output signal from said automatic frequency control circuitry for establishing a direct voltage level representative of the level of said output signal;
    means responsive to said direct voltage for applying an adjustment signal to said line rate oscillator, wherein said interface circuit comprises first and second transistors for increasing current flow to said line rate oscillator when direct voltage is above a first predetermined level and for decreasing current flow to said line rate oscillator when said direct voltage is below a second predetermined level.

* * * * *